US012574680B2

(12) United States Patent
Ding et al.

(10) Patent No.: US 12,574,680 B2
(45) Date of Patent: Mar. 10, 2026

(54) HOWLING SUPPRESSION METHOD AND APPARATUS, AND IN-EAR EARPHONES AND STORAGE MEDIUM

(71) Applicant: GOERTEK TECHNOLOGY CO., LTD, Qingdao (CN)

(72) Inventors: Zhihui Ding, Qingdao (CN); Guojun Xu, Qingdao (CN)

(73) Assignee: GOERTEK TECHNOLOGY CO., LTD, Qingdao (CN)

( * ) Notice: Subject to any disclaimer, the term of this patent is extended or adjusted under 35 U.S.C. 154(b) by 220 days.

(21) Appl. No.: 18/683,037

(22) PCT Filed: Dec. 23, 2021

(86) PCT No.: PCT/CN2021/140775
§ 371 (c)(1),
(2) Date: Feb. 12, 2024

(87) PCT Pub. No.: WO2023/024361
PCT Pub. Date: Mar. 2, 2023

(65) Prior Publication Data

US 2025/0133339 A1 Apr. 24, 2025

(30) Foreign Application Priority Data

Aug. 25, 2021 (CN) ........................ 202110982814.X

(51) Int. Cl.
*H04R 3/02* (2006.01)
*H04R 1/10* (2006.01)
(Continued)

(52) U.S. Cl.
CPC ............. *H04R 3/02* (2013.01); *H04R 1/1041* (2013.01); *H04R 3/04* (2013.01); *H04R 29/001* (2013.01); *H04R 2430/01* (2013.01)

(58) Field of Classification Search
CPC .. H04R 25/453; H04R 25/305; H04R 25/554; H04R 25/558; H04R 2225/41;
(Continued)

(56) References Cited

U.S. PATENT DOCUMENTS 11,700,486 B2 * 7/2023 Schreibman ........ G10L 21/0232 381/93
2007/0206817 A1 * 9/2007 Sakuraba .............. H04M 9/082 379/406.01
(Continued)

FOREIGN PATENT DOCUMENTS

CN 206686367 U 11/2017
CN 108449503 A 8/2018
(Continued)

OTHER PUBLICATIONS

International Search Report from International Application No. PCT/CN2021/140775 mailed Jun. 1, 2022.

*Primary Examiner* — Lun-See Lao
(74) *Attorney, Agent, or Firm* — Shih IP Law Group, PLLC

(57) ABSTRACT

Disclosed is a howling suppression method, including: determining, according to an audio signal collected by a microphone, whether a howling event occurs; if a howling event occurs, determining a howling type corresponding to the howling event; if the howling type is impulse wave howling, reducing an amplitude gain of a frequency band to which the howling event belongs, and performing a filtering process on the audio signal the amplitude gain reduction of which is reduced, to obtain a target audio signal; and controlling a speaker to play the target audio signal. According to the present disclosure, howling event suppression effect can be improved, thereby reducing the damage of audio playing to the hearing of a user. Further disclosed in the present disclosure are a howling suppression apparatus,
(Continued)

an in-ear earphone, and a storage medium, to which the howling suppression method is applied.

10 Claims, 3 Drawing Sheets

(51) Int. Cl.
*H04R 3/04* (2006.01)
*H04R 29/00* (2006.01)

(58) Field of Classification Search
CPC H04R 2225/83; H04R 2460/15; H04R 25/30; H04R 25/70; H04R 3/02; H04R 1/1016; H04R 1/1041; H04R 1/1083; H04R 2430/01; H04R 2460/01; H04R 29/001; H04R 3/04; H04M 9/082; H04M 3/002; H04M 3/2236; H04M 3/28; G10K 11/17881; G10K 11/178; G10K 11/17817; G10K 2210/504; G10K 11/17854; G10K 2210/1081; G10L 19/167; G10L 2021/02082; G10L 21/01; H04L 43/0852; H04L 43/087; H04L 47/283; H04L 51/04; G01R 31/25
USPC ...................................... 381/56–58, 104–107
See application file for complete search history.

(56) References Cited

U.S. PATENT DOCUMENTS

| | | | | |
|---|---|---|---|---|
| 2013/0170660 | A1* | 7/2013 | Kristensen | H04R 25/305 381/60 |
| 2017/0201836 | A1* | 7/2017 | Hui | G06F 3/165 |
| 2019/0052555 | A1* | 2/2019 | Every | H04L 43/0852 |
| 2021/0243525 | A1* | 8/2021 | Reuter | G10L 21/0232 |

FOREIGN PATENT DOCUMENTS

| | | | |
|---|---|---|---|
| CN | 110677796 | A | 1/2020 |
| CN | 113593518 | A | 11/2021 |
| JP | 2006217257 | A | 8/2006 |
| JP | 2007329805 | A | 12/2007 |
| KR | 20200128687 | A | 11/2020 |
| WO | 2019174492 | A1 | 9/2019 |

* cited by examiner

HOWLING SUPPRESSION METHOD AND APPARATUS, AND IN-EAR EARPHONES AND STORAGE MEDIUM

The present disclosure claims the priority to the Chinese Patent Disclosure No. 202110982814.X, entitled "HOWLING SUPPRESSION METHOD AND APPARATUS, AND IN-EAR EARPHONES AND STORAGE MEDIUM" filed with China Patent Office on Aug. 25, 2021, the entire contents of which are incorporated into the present disclosure by reference.

TECHNICAL FIELD

The present disclosure relates to a technical field of audio processing, and more particularly, to a howling suppression method and apparatus, and in-ear earphones and a storage medium.

DESCRIPTION OF RELATED ART

As we age, the range of frequencies that human ears can hear may decrease. The "World Hearing Report" released by the WHO states that one fifth of the world's people are experiencing hearing impairment, and hearing loss affects more than 1.5 billion people worldwide, of which 430 million people have moderate or higher hearing loss in the ear having better hearing, accordingly, the WHO recommends that ear and hearing care should be available to all. Due to market incentives, an auxiliary hearing function of TWS (True Wireless Stereo) earphones is becoming more and more important. Due to the hearing loss of hearing-impaired people in specific frequency bands, the auxiliary hearing function of TWS earphones is implemented by gain amplification in the missing frequency band for hearing-impaired patients. However, when implementing the auxiliary hearing function, since a distance between the microphone and the speaker is too close, howling phenomenon occurs.

In related art, adaptive filters are mainly used to suppress howling. However, when howling occurs in a higher frequency band, howling cannot be suppressed by simply use an adaptive filter, so as to impair the user's hearing.

Therefore, how to improve the suppression effect of howling events and reduce the damage to the user's hearing caused by audio playing are technical problems need to be solved.

SUMMARY

An object of the present disclosure is to provide a howling suppression method and apparatus, and an in-ear earphone and storage medium, which can improve the suppression effect of howling events and reduce the damage to the user's hearing caused by audio playing.

In order to achieve the above object, the present disclosure provides a howling suppression method, the howling suppression method includes:

determining, according to an audio signal collected by a microphone, whether a howling event occurs;

if a howling event occurs, determining a howling type corresponding to the howling event;

if the howling type is impulse wave howling, reducing an amplitude gain of a frequency band to which the howling event belongs, and performing a filtering process on the audio signal the amplitude gain reduction of which is reduced, to obtain a target audio signal; and controlling a speaker to play the target audio signal.

Optionally, performing a filtering process on the audio signal the amplitude gain reduction of which is reduced, to obtain the target audio signal includes:

determining a speaker reference signal collected by a feedback microphone;

inputting the speaker reference signal and the audio signal the amplitude gain reduction of which is reduced into an adaptive filter, to obtain a first filtering result;

inputting the first filtering result and the audio signal the amplitude gain reduction of which is reduced into a nonlinear post-processing filter, to obtain a second filtering result; and superimposing the first filtering result and the second filtering result to obtain a superposed result, and subtracting the superposed result from the audio signal, to obtain the target audio signal.

Optionally, determining, according to an audio signal collected by a microphone, whether a howling event occurs includes:

determining, according to an amplitude of the audio signal collected by the microphone, whether a howling event occurs.

Optionally, determining the howling type corresponding to the howling event includes:

extracting a feature vector from the audio signal;

inputting the feature vectors into a howling determining model; and determining the howling type corresponding to the howling event according to an output result of the howling type determining model.

Optionally, the method further includes:

after determining the howling type according to the frequency band to which the howling event belongs, if the howling type is non-impulse wave howling, performing a filtering process on the collected audio signal by using an adaptive filter, to obtain the target audio signal.

Optionally, reducing the amplitude gain of the frequency band to which the howling event belongs includes:

determining the gain change amount according to the span and energy of the frequency band to which the howling event belongs; and reducing the amplitude gain of the frequency band to which the howling event belongs according to the gain change amount.

Optionally, the method further includes:

after reducing the amplitude gain of the frequency band to which the howling event belongs according to the gain change amount, extending a preset duration; and determining whether a howling event occurs at the current moment, if a howling event occurs, reducing the gain change amount by a preset value to obtain a new gain change amount, and reducing the amplitude gain of the frequency band to which the howling event belongs according to the new gain change amount.

The present disclosure also provides a howling suppression apparatus, the howling suppression apparatus includes:

a howling detecting module configured to determine whether a howling event occurs according to an audio signal collected by a microphone;

a howling type determining module configured determine a howling type corresponding to the howling event if a howling event occurs;

a signal adjustment module configured to reduce an amplitude gain of the frequency band to which the howling event belongs if the howling type is impulse wave howling, and perform a filtering process on the audio signal the amplitude gain reduction of which is reduced, to obtain the target audio signal; and an audio playback module configured to control a speaker to play the target audio signal.

The present disclosure also provides a storage medium, on which a computer program is stored, wherein when the computer program is executed, steps of the howling suppression method are implemented.

The present disclosure provides an in-ear earphone including a microphone, a speaker, a memory and a processor, wherein a computer program is stored in the memory, and when the computer program in the memory is executed by the processor, steps of the above howling suppression method are implemented.

The present disclosure provides a howling suppression method, including the following steps: determining, according to an audio signal collected by a microphone, whether a howling event occurs; if a howling event occurs, determining the howling type corresponding to the howling event; if the howling type is impulse wave howling, reducing the amplitude gain of a frequency band to which the howling event belongs, and performing a filtering process on the audio signal the amplitude gain reduction of which is reduced, to obtain a target audio signal; and controlling a speaker to play the target audio signal.

According to the present disclosure, if it is determined that a howling event occurs, determine a howling type corresponding to the howling event, so as to determine a frequency band to which the howling event belongs according to the howling type. If the howling type is impulse wave howling, it means that the energy of the howling event is high, and at this time, the howling cannot be completely suppressed by only using a filter. In the present disclosure, amplitude gains of the frequency band to which the howling event belongs is reduced, and then a filtering process on the audio signal the amplitude gain reduction of which is reduced is performed, to obtain a target audio signal. There are fewer feedback signals that can cause howling in the target audio signal, thus using a speaker to play the target audio signal can improve the suppression effect of howling event, reduce the damage to the user's hearing caused by audio playback. In addition, the present disclosure provides a howling suppression apparatus, a storage medium, and an in-ear earphone, to which the howling suppression method is applied, but will not be repeated herein.

BRIEF DESCRIPTION OF DRAWINGS

In order to more clearly illustrate the embodiments of the present disclosure, the drawings required to be used for the embodiments will be briefly introduced in the following. Obviously, the drawings in the following description are only some embodiments of the present disclosure, and for those of ordinary skill in the art, other drawings can also be obtained from the provided drawings without any creative effort.

DETAILED DESCRIPTIONS

Solutions of embodiments of the present disclosure will be clearly and completely described below in order to make the purpose, solutions and advantages of the embodiments of the present disclosure apparent. Obviously, the described embodiments are only a part of the embodiments of the present disclosure, rather than all the embodiments. Based on the embodiments in the present disclosure, all other embodiments obtained by those of ordinary skill in the art without creative efforts shall fall within the protection scope of the present disclosure.

Figure 1:
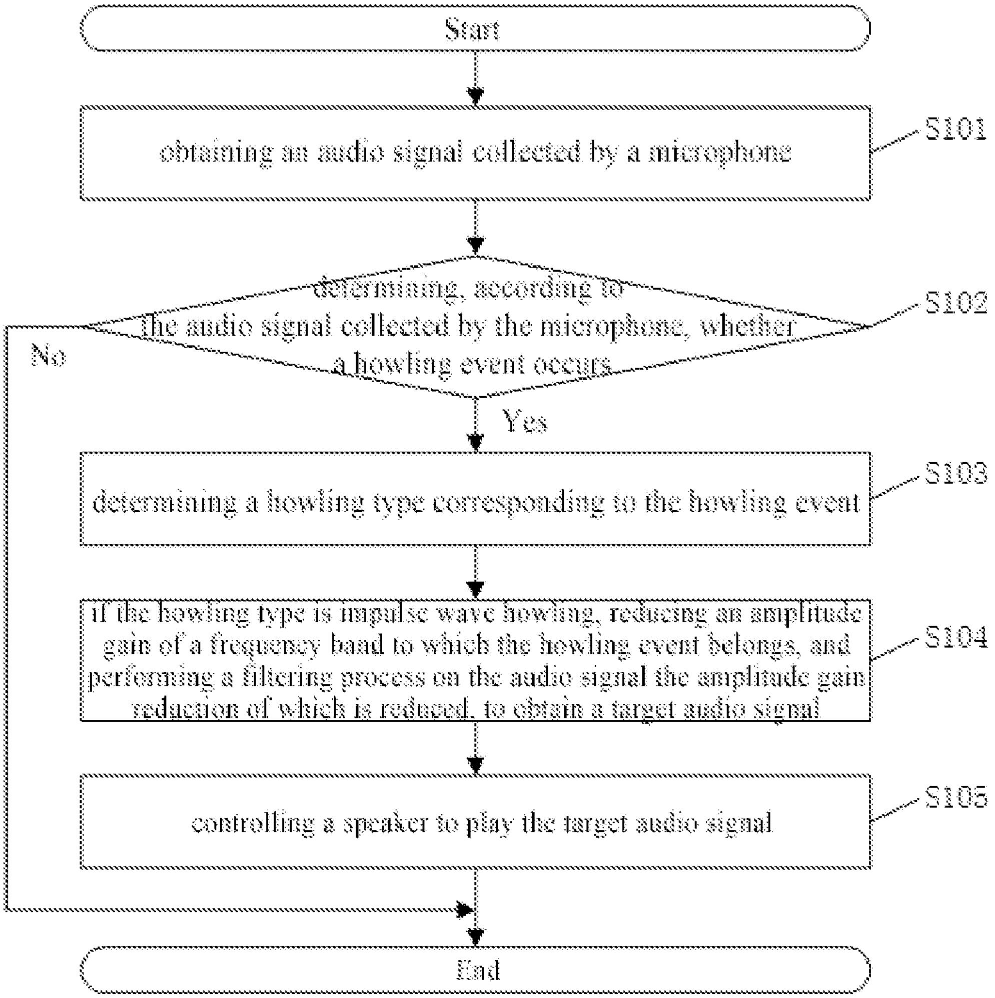
FIG. 1 is a flow chart of a howling suppression method according to an embodiment of the present disclosure.

Referring to FIG. 1, FIG. 1 is a flow chart of a howling suppression method according to an embodiment of the present disclosure.

Specifically, the method includes the following steps:

S101: obtaining an audio signal collected by a microphone.

Here, the embodiment may be applied to hearing aids, earphones and other devices equipped with a microphone (e.g., a feedback microphone) and a speaker. When a distance between the microphone and the speaker is too close or a sound output by the speaker is too loud, the microphone collects an output signal of the speaker, so that the output signal of the speaker is amplified again, resulting in a howling event.

S102: determining, according to the audio signal collected by the microphone, whether a howling event occurs; if a howling event occurs, enter S102; if not, end the process.

After obtaining g the audio signal collected by the microphone, whether a howling event occurs may be determined based on an amplitude of the audio signal. That is, when there is a signal with an amplitude greater than a preset amplitude in the audio signal, it is determined that a howling event is detected.

S103: determining a howling type corresponding to the howling event.

Here, the howling types may include impulse wave howling and non-impulse wave howling. The energy of the impulse wave howling is higher than the energy of the non-impulse wave howling. In the present disclosure, the impulse wave howling and the non-impulse wave howling may be divided according to the ability of an adaptive filter to process howling. For example, the highest energy of howling that the adaptive filter can suppress is A, the howling type of a howling event with energy greater than A is impulse wave howling, and the howling type of a howling event with energy less than or equal to A is non-impulse wave howling.

S104: if the howling type is impulse wave howling, reducing an amplitude gain of a frequency band to which the howling event belongs, and performing a filtering process on the audio signal the amplitude gain reduction of which is reduced, to obtain a target audio signal.

Here, the howling event occurs at the current moment is caused by a shock wave, and the howling event cannot be suppressed by only using an adaptive filter. In the embodiment, the audio signal first is gained and then processed. Specifically, an amplitude of the frequency band to which the howling event belongs is gained, and then filtering process is performed on the audio signal the amplitude gain reduction of which is reduced, to obtain the target audio signal.

S105: controlling a speaker to play the target audio signal.

According to the embodiment, if it is determined that a howling event occurs, determine a howling type corresponding to the howling event, so as to determine the frequency band to which the howling event belongs according to the howling type. If the howling type is impulse wave howling, it means that the energy of the howling event is high, and at this time, the howling cannot be completely suppressed by using only a filter. In the embodiment, amplitude gains of the frequency band to which the howling event belongs is reduced, and then a filtering process on the audio signal the amplitude gain reduction of which is reduced is performed, to obtain a target audio signal. There are fewer feedback signals that can cause howling in the target audio signal, and thus using a speaker to play the target audio signal can improve the suppression effect of howling event, reduce the damage to the user's hearing caused by audio playback.

Figure 2:
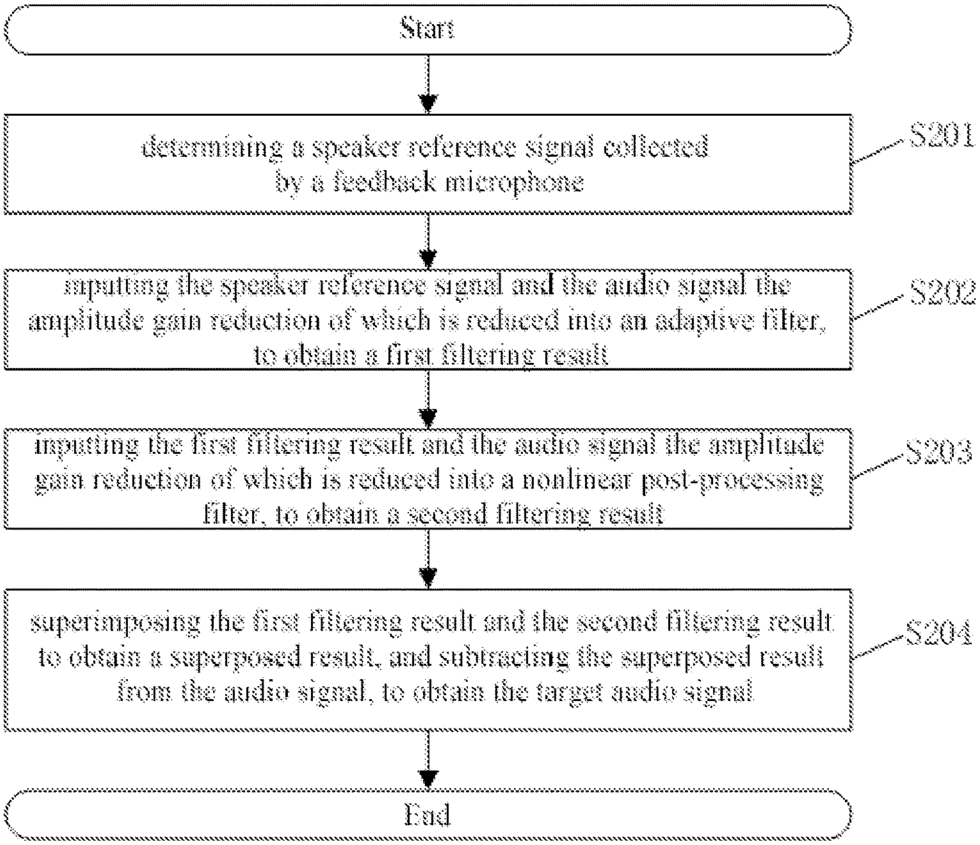
FIG. 2 is a schematic diagram of an audio signal filtering process method according to an embodiment of the present disclosure.

As an embodiment, for impulse wave howling, an adaptive filter and a nonlinear post-processing filter may be cooperated to process the audio signal, to obtain the target audio signal. Referring to FIG. 2, FIG. 2 is a schematic diagram of an audio signal filtering process method according to an embodiment of the present disclosure. This embodiment is a further introduction of S104 in the embodiment of FIG. 1, i.e., the filtering process on the audio signal the amplitude gain reduction of which is reduced, and includes:

S201: determining a speaker reference signal collected by a feedback microphone.

Here, in the embodiment, a speaker reference signal collected by a feedback microphone is used as a reference to remove or reduce nonlinear distortion howling.

S202: inputting the speaker reference signal and the audio signal the amplitude gain reduction of which is reduced into an adaptive filter, to obtain a first filtering result.

S203: inputting the first filtering result and the audio signal the amplitude gain reduction of which is reduced into a nonlinear post-processing filter, to obtain a second filtering result.

S204: superimposing the first filtering result and the second filtering result to obtain a superposed result, and subtracting the superposed result from the audio signal, to obtain the target audio signal.

In the embodiment, an adaptive filter is used to eliminate linear echo, and a nonlinear post-processing filter is used to eliminate nonlinear echo. The first filtering result and the second filtering result are superimposed to obtain the target audio signal in which the linear echo and nonlinear echo are eliminated.

As an alternative embodiment, after determining the howling type according to the frequency band to which the howling event belongs, if the howling type is non-impulse wave howling, an adaptive filter is used to filter the collected audio signal, to obtain the target audio signal.

As an alternative embodiment, since the howling event refers to a situation where the energy (amplitude) of an output signal of the speaker in a high-frequency band is too high, the audio signal collected by the microphone includes the output signal of the speaker and an output signal of non-speaker (such as user voice, environmental noise, etc.). In the embodiment, whether a howling event occurs may be determined according to the amplitude of the audio signal collected by the microphone.

Accordingly, the embodiment can also determine the howling type using the speaker reference signal. It may include the steps of: extracting feature vectors from the audio signal; inputting the feature vectors into a howling type determining model; and determining the howling type corresponding to the howling event according to an output result of the howling type determining model.

As an embodiment, the above embodiment can reduce the amplitude gain of the frequency band to which the howling event belongs by way of: determining the gain change amount according to the span and energy of the frequency band to which the howling event belongs; and reducing the amplitude gain of the frequency band to which the howling event belongs according to the gain change amount.

Further, after reducing the amplitude gain of the frequency band to which the howling event belongs according to the gain change amount, the method may include: extending a preset duration and determining whether a howling event occurs at the current moment; if a howling event occurs, reducing the gain change amount by a preset value to obtain a new gain change amount, and reducing the amplitude gain of the frequency band to which the howling event belongs according to the new gain change amount.

Figure 3:
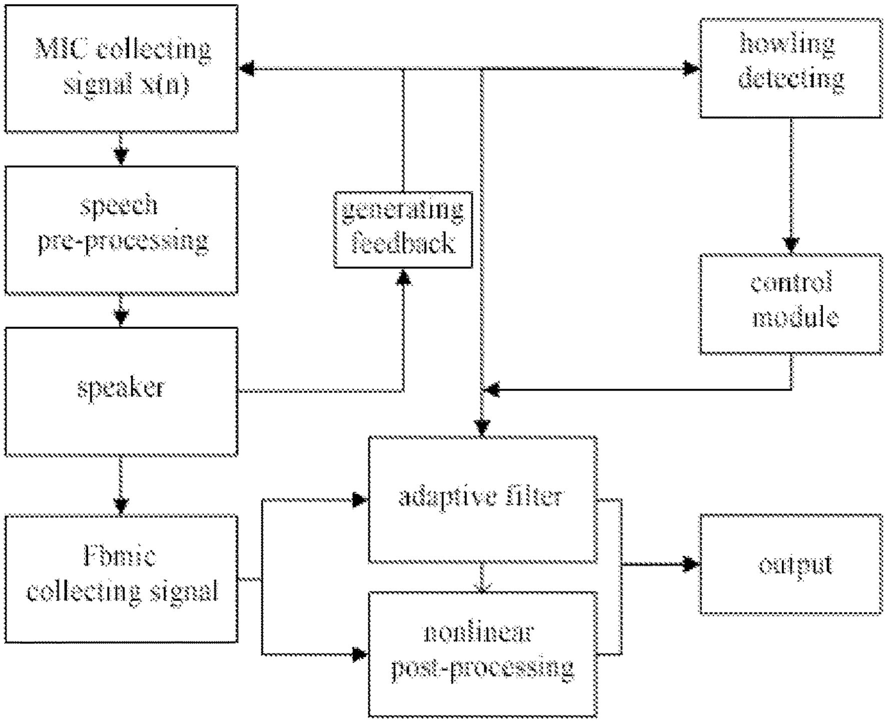
FIG. 3 is a schematic diagram showing a howling suppression principle according to an embodiment of the present disclosure.

Hereinafter, the process described in the above embodiments will be described below through a howling suppression solution for in-ear earphones in practical applications. FIG. 3 is a schematic diagram showing a howling suppression principle according to an embodiment of the present disclosure. In this embodiment, a speaker signal collected by a feedback microphone is used as a reference, and a gain of the howling part can be reduced according to the howling type to maintain the stability of the adaptive filter. As illustrated in FIG. 3, a sound signal is collected by the microphone and passes through the speaker after speech pre-processing, the speech pre-processing includes noise reduction and dynamic range control processing, the signal passes through a feedback microphone of the speaker and a sound played by the speaker is collected. At this time, since a distance between the microphone and the speaker is short, the sound amplified by the speaker is picked up again by the microphone, and the picked-up signal is transmitted to the speaker again by the microphone. After multiple cycles, the signal is infinitely superimposed and amplified, and the amplitude is infinitely superimposed at a certain frequency point, resulting in howling.

Assume that the signal collected by the microphone is X, a pure speech signal is S, and a feedback signal is N, a relationship between the above signals is: X=S+N. The pure speech signal refers to a speech signal without any noise or feedback. The feedback signal refers to a signal output by the speaker and picked up by the microphone. The feedback signal can be determined based on a feedback path and the speaker reference signal, that is: N=F*Y, wherein F represents the feedback path, and Y represents the speaker signal. The feedback path refers to a propagation path of sound. For example, a sound is emitted by the speaker and is picked up by the microphone, the feedback path is a path where the sound from the speaker travels to the microphone. The speaker signal is used as a reference signal when processed in the filter, and accordingly, the speaker signal is also referred to as a speaker reference signal.

In order to solve the problem of howling, it is necessary to accurately estimate the feedback path and speaker signal. Estimating the feedback path means obtaining an estimation of the feedback path based on an update of the adaptive filter. The formula for feedback path estimation is: F' (t)=F' (t−1)+a((Y*Y)/((Y*E)+d)); wherein a represents a preset coefficient, E represents an error signal at the previous moment, t represents time, F' represents the estimated feedback path information, and F represents the real feedback path information. In the embodiment, the feedback path information estimated by the above formula can be used as the real feedback path information, E(t−1)=X−F' (t−1)*Y (t−1). To accurately estimate the coefficient, the reference signal Y, which is the sound emitted by the speaker, should be accurately obtained. The sound of the speaker may experience non-linear distortion after passing through the path or being gained again, as a result, directly using the speaker signal as a reference is quite different from the actual one. In the embodiment, a feedback microphone can be used to collect the sound of the speaker as a reference, which can effectively remove or reduce nonlinear components. Since the speaker signal may have non-linear distortion after amplification and output, this part of the non-linear distortion cannot be precisely estimated, but the speaker signal of the feedback microphone is actually the sound played by the speaker.

The update principle of the adaptive filter is that the update is stable when the signal is stable. If an impulse wave howling occurs, it will unable to converge when updating the adaptive filter, such that when there is an impulse wave howling caused by sounds such as a horn, the embodiment can accurately estimate the feedback path by first reducing the gain and then updating the coefficient of the adaptive filter.

The howling type can be classified based on excitation signals or normal speech signals, for example, a sound of horn, a working sound of microwave oven, and a speech signal may be included. In the embodiment, howling type determining models of neural networks such as Deep Neural Networks (DNN), Recurrent Neural Network (RNN), and Convolutional Neural Networks (CNN) may be used to perform howling determining. The classified signal is processed, if it is a sound of microwave oven or a whistle sound, frequency gain control is performed first, and then filtering is performed according to the adaptive filter to remove the feedback signal. However, since the speaker signal is an amplified signal after processing, the signal inevitably undergoes nonlinear changes, and NLP is added to filter the signal, which solves an error caused by nonlinearity and eliminates the instability of high-frequency gain.

Figure 4:
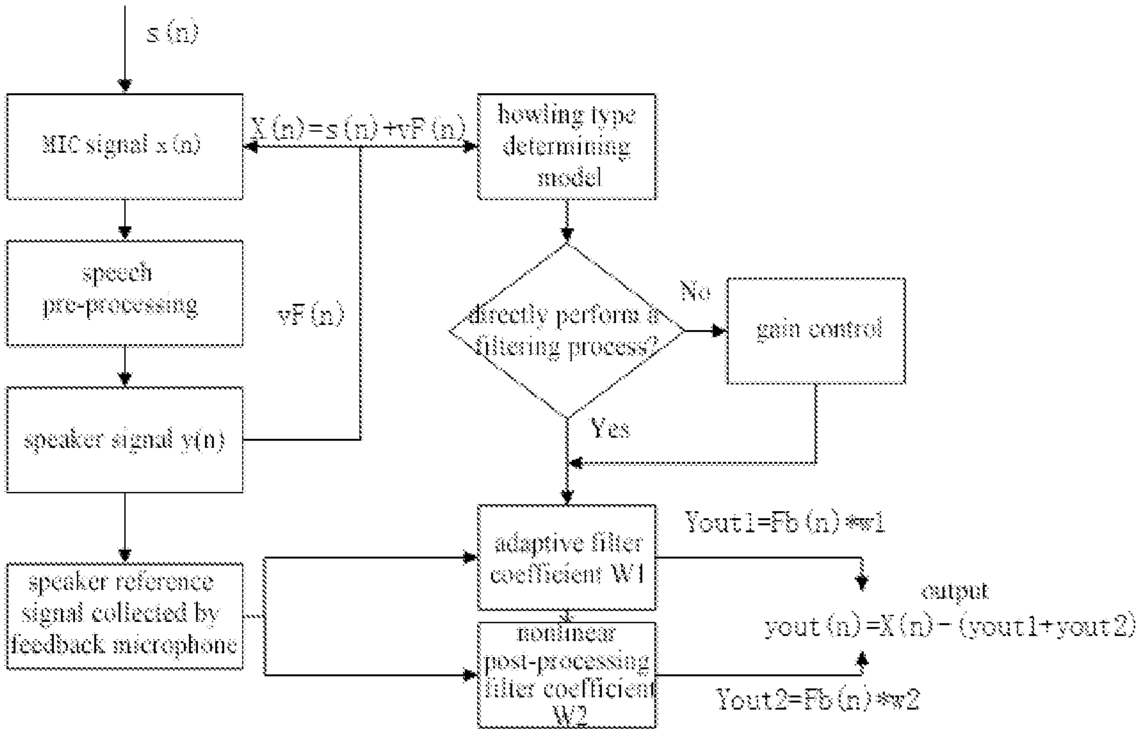
FIG. 4 is a flow chart of sound signal processing for suppressing howling according to an embodiment of the present disclosure.

Referring to FIG. 4, FIG. 4 is a flow chart of sound signal processing for suppressing howling according to an embodiment of the present disclosure. The flow chart includes the following steps:

The microphone collects an audio signal X(n), and performs speech pre-processing operations such as noise reduction and dynamic range control on the audio signal X(n). In FIG. 4, s (n) represents a pure signal without feedback signal, and vF(n) represents the feedback signal.

The audio signal X(n) after pre-processing operations is input into the howling type determining model, if the howling is an impulse wave howling, a gain value G of the frequency band where the howling is located is adjusted by performing gain control at a specific frequency point, the gain value G represents a gain range level value of the howling point. The frequency point with the above characteristics refers to the frequency band where the howling is located.

The neural networks mainly determine the type based on the microphone signal. Feature extraction is performed on the audio signal X (n) collected from the microphone, and the extracted feature vector has a length of 22. The feature vector is input into the howling type determining model for determination, in order to determine whether there is a howling signal in the microphone, and if the howling is an impulse wave howling, there is a large value in the feature, the neural network will tend to determine that there is an impulse wave howling, and at this time, the result will be fed back to the dynamic range gain control algorithm module to reduce the increase in gain to the microphone signal. The control of the gain G is gradually reduced through gain loop control until the neural network determines that there is no impulse wave howling. The feature extraction algorithm of the microphone may be Mel Frequency Cepstral Coefficients (MFCCs). The feature extraction operation includes: dividing the frequency band into 22 frequency bands, calculating the frequency band energy and then calculating the discrete cosine transform, and obtaining a total of 22 numerical values.

Further, if the howling type is normal speech and mid-to-high frequency howling (that is, howling with small energy), an adaptive filter may be used to process the howling.

A speaker y(n) is collected by the feedback microphone as Fb(n), and this signal is used as a reference ref of the adaptive filter; the coefficient of the adaptive filter is W1, and the input are the microphone signal X(n) and the reference signal ref. The coefficient of the nonlinear post-processing filter (nonlinear processor, NLP) is updated to W2, and the input are an output e(n) of the adaptive filter and the reference signal ref; the coefficient of the nonlinear post-processing filter is updated according to the reference signal and the output of the adaptive filter.

The function of the adaptive filter is to eliminate linear echo, and the function of the nonlinear post-processing filter is to eliminate nonlinear echo. The final output includes yout1 with linear feedback removed and yout2 with nonlinear feedback removed, so that the final superposition yout(n) does not include feedback signal, thus avoiding the generation of howling. When the signal is over-amplified, nonlinear distortion is serious due to the increase in vibrating molecules around the speaker. By using an adaptive filter and a nonlinear post-processing filter for combined feedback elimination, feedback signals that cause howling can be effectively removed. The embodiment can solve the instability caused by wide dynamic range adjustment during forward processing.

Since howling occurs in a high-frequency part, the feedback signal attenuation effect of the adaptive filter combined with signal pre-processing on the high-frequency signal is extremely unstable, howling occurs sometimes without ground. The embodiment detects the howling type and controls the gain of the howling frequency point to update the adaptive filter and control the step size of the adaptive filter, and for high-frequency howling, the gain is first reduced and then processing is performed, so that the adaptive filter can operate stably. The generation of howling is basically an increase in gain. The howling types are classified based on the number of frequency points of howling generated by different sound sources and the frequency point characteristics of howling. In the embodiment, neural networks are used to determine the howling type, mainly including howling caused by external excitation sources such as a horn, speech sources, and noise sources. The gain attenuation control is directly performed according to the howling type, and the step size of the filter is adjusted. And, the feedback coefficient is controlled according to the volume of data collected by the feedback microphone, and combined feedback elimination is performed by cooperating with the nonlinear post-processing filter, so as to suppress the howling.

Figure 5:
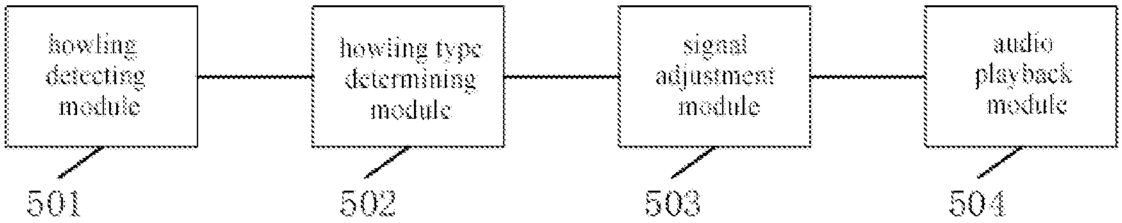
FIG. 5 is a schematic structural diagram of a howling suppression apparatus according to an embodiment of the present disclosure.

Referring to FIG. 5, FIG. 5 is a schematic structural diagram of a howling suppression apparatus according to an embodiment of the present disclosure. The apparatus includes:

- a howling detecting module 501 configured to determine whether a howling event occurs according to an audio signal collected by a microphone;
- a howling type determining module 502 configured to determine a howling type corresponding to the howling event if a howling event occurs;
- a signal adjustment module 503 configured to reduce an amplitude gain of the frequency band to which the howling event belongs if the howling type is impulse wave howling, and perform a filtering process on the audio signal the amplitude gain reduction of which is reduced, to obtain a target audio signal; and
- an audio playback module 504 configured to control a speaker to play the target audio signal.

In the embodiment, if it is determined that a howling event occurs, determine a howling type corresponding to the howling event, so as to determine the frequency band to which the howling event belongs according to the howling type. If the howling type is impulse wave howling, it means that the energy of the howling event is high, and at this time, the howling cannot be completely suppressed by using only a filter. In the embodiment, an amplitude gain of the frequency band to which the howling event belongs is reduced, and then a filtering process on the audio signal the amplitude gain reduction of which is reduced is performed, to obtain a target audio signal. There are fewer feedback signals that can cause howling in the target audio signal, thus using a speaker to play the target audio signal can improve the suppression effect of howling event, reduce the damage to the user's hearing caused by audio playback.

Further, the signal adjustment module 503 is used to determine the speaker reference signal collected by the feedback microphone; and is also used to input the speaker reference signal and the audio signal the amplitude gain reduction of which is reduced into the adaptive filter to obtain a first filtering result; and is also used to input the first filtering result and the audio signal the amplitude gain reduction of which is reduced into the nonlinear post-processing filter to obtain a second filtering result; and is also used to superimpose the first filtering result and the second filtering result to obtain a superposed result, and subtract the superposed result from the audio signal, to obtain the target audio signal.

Further, the howling detecting module 501 is used to determine, according to the amplitude of the audio signal collected by the microphone, whether a howling event occurs.

Further, the howling type determining module 502 is used to extract feature vectors in the audio signal; and the howling type determining module 502 is also used to input the feature vectors into a howling type determining model, and determine a howling type corresponding to the howling event according to an output result of the howling type determining model.

Further, the signal adjustment module 503 is also used to, after determining the howling type according to the frequency band to which the howling event belongs, if the howling type is non-impulse wave howling, perform a filtering process on the collected audio signal by using the adaptive filter, to obtain the target audio signal.

Further, the signal adjustment module 503 is also used to determine the gain change amount according to the span and energy of the frequency band to which the howling event belongs; and is also used to reduce the amplitude gain of the frequency band to which the howling event belongs according to the gain change amount.

Furthermore, the apparatus also includes a gain adjustment module configured to, after reducing the amplitude gain of the frequency band to which the howling event belongs according to the gain change amount, extend a preset duration and determining whether a howling event occurs at the current moment; and if a howling event occurs, reduce the gain change amount by a preset value to obtain a new gain change amount, and reduce the amplitude gain of the frequency band to which the howling event belongs according to the new gain change amount.

Since the embodiments of the apparatus correspond to the embodiments of the method, the description of the embodiments of the apparatus refers to the description of the embodiments of the method, and it will not be repeated here.

The present disclosure provides a storage medium, on which a computer program is stored, wherein when the computer program is executed, steps provided in the above embodiments can be implemented. The storage medium may include U disk, mobile hard disk, read-only memory (ROM), random access memory (RAM), magnetic disk, optical disk or other various media that can store program codes.

The present disclosure provides an in-ear earphone including a feedback microphone, a speaker, a memory and a processor, wherein a computer program is stored in the memory, and when the computer program in the memory is executed by the processor, steps provided in the above embodiments can be implemented. The in-ear earphone may include wired earphones and wireless earphones (such as TWS true wireless earphones).

The various embodiments in the present specification are described in a progressive manner, and each embodiment focuses on the differences from other embodiments, and the same and similar parts between the various embodiments can be referred to each other. As for the apparatus disclosed in the embodiments, since it corresponds to the method disclosed in the embodiments, the description is relatively simple. For relevant parts, please refer to the description of the method. It should be noted that for those of ordinary skill in the art, several improvements and modifications can be made to the present disclosure without departing from the principles of the present disclosure, and these improvements and modifications also fall within the protection scope of the claims of the present disclosure.

It should be noted that relational terms such as first and second described herein are only used to distinguish one entity or operation from another entity or operation, and do not necessarily require or imply any such actual relationship or order between these entities or operations. Moreover, terms such as "include", "comprise" or any other variation thereof are intended to encompass a non-exclusive inclusion such that a process, method, article or device that includes a series of elements includes not only those elements, but also other elements not explicitly listed, or elements inherent to such a process, method, article or device. Without further limitation, the element defined by the phrase "including a . . . " does not preclude the presence of additional identical elements in the process, method, article or device including the element.

What is claimed is:

1. A howling suppression method, comprising:
 determining, according to an audio signal collected by a microphone, whether a howling event occurs;
 if a howling event occurs, determining a howling type corresponding to the howling event;
 if the howling type is impulse wave howling, reducing an amplitude gain of a frequency band to which the howling event belongs, and performing a filtering process on the audio signal the amplitude gain reduction of which is reduced, to obtain a target audio signal; and
 controlling a speaker to play the target audio signal.

2. The howling suppression method of claim 1, wherein performing a filtering process on the audio signal the amplitude gain reduction of which is reduced, to obtain the target audio signal comprises:
 determining a speaker reference signal collected by a feedback microphone;
 inputting the speaker reference signal and the audio signal the amplitude gain reduction of which is reduced into an adaptive filter, to obtain a first filtering result;
 inputting the first filtering result and the audio signal the amplitude gain reduction of which is reduced into a nonlinear post-processing filter, to obtain a second filtering result; and
 superimposing the first filtering result and the second filtering result to obtain a superposed result, and subtracting the superposed result from the audio signal, to obtain the target audio signal.

3. The howling suppression method of claim 1, wherein determining, according to an audio signal collected by a microphone, whether a howling event occurs comprises:
 determining, according to an amplitude of the audio signal collected by the microphone, whether a howling event occurs.

4. The howling suppression method of claim 3, wherein determining the howling type corresponding to the howling event comprises:
 extracting a feature vector from the audio signal;
 inputting the feature vectors into a howling type determining model; and
 determining the howling type corresponding to the howling event according to an output result of the howling type determining model.

5. The howling suppression method of claim 1, further comprising: after determining the howling type according to the frequency band to which the howling event belongs, if the howling type is non-impulse wave howling, performing a filtering process on the collected audio signal by using an adaptive filter, to obtain the target audio signal.

6. The howling suppression method of claim 1, wherein reducing the amplitude gain of the frequency band to which the howling event belongs comprises:
 determining a gain change amount according to a span and energy of the frequency band to which the howling event belongs; and
 reducing the amplitude gain of the frequency band to which the howling event belongs according to the gain change amount.

7. The howling suppression method of claim 6, further comprising: after reducing the amplitude gain of the frequency band to which the howling event belongs according to the gain change amount, extending a preset duration; and
 determining whether a howling event occurs at the current moment,
 if a howling event occurs, reducing the gain change amount by a preset value to obtain a new gain change amount, and reducing the amplitude gain of the frequency band to which the howling event belongs according to the new gain change amount.

8. An in-ear earphone comprising a microphone, a speaker, a memory and a processor, wherein a computer program is stored in the memory, and when the computer program in the memory is executed by the processor, steps of the howling suppression method of claim 1 are implemented.

9. A storage medium, in which computer executable instructions are stored, wherein when the computer executable instructions are loaded and executed by a processor, steps of the howling suppression method of claim 1 are implemented.

10. A howling suppression apparatus comprising:
 a howling detecting module configured to determine whether a howling event occurs according to an audio signal collected by a microphone;
 a howling type determining module configured to determine a howling type corresponding to the howling event if a howling event occurs;
 a signal adjustment module configured to reduce an amplitude gain of a frequency band to which the howling event belongs if the howling type is impulse wave howling, and perform a filtering process on the audio signal the amplitude gain reduction of which is reduced, to obtain a target audio signal; and
 an audio playback module configured to control a speaker to play the target audio signal.

* * * * *